US007175229B2

(12) United States Patent
Garcia

(10) Patent No.: US 7,175,229 B2
(45) Date of Patent: Feb. 13, 2007

(54) VEHICLE SPOILER WITH SPINNER MECHANISM

(76) Inventor: Martin Lee Garcia, 924 S. Arden Pl. #7, Anaheim, CA (US) 92802

( * ) Notice: Subject to any disclaimer, the term of this patent is extended or adjusted under 35 U.S.C. 154(b) by 0 days.

(21) Appl. No.: 11/367,861

(22) Filed: Mar. 2, 2006

(65) Prior Publication Data

US 2006/0261637 A1    Nov. 23, 2006

Related U.S. Application Data

(63) Continuation-in-part of application No. 29/230,466, filed on May 20, 2005.

(51) Int. Cl.
*B60J 1/00* (2006.01)
(52) U.S. Cl. .................. 296/180.1; 296/180.2
(58) Field of Classification Search ............ 296/180.1, 296/180.2, 180.3, 180.4, 180.5; 180/903
See application file for complete search history.

(56) References Cited

U.S. PATENT DOCUMENTS

| D303,103 S | 8/1989 | Brouch et al. |
| 4,867,499 A * | 9/1989 | Stephan et al. ................ 296/50 |
| 5,516,178 A * | 5/1996 | Grant ......................... 296/57.1 |
| D379,080 S | 5/1997 | Choi |
| D476,831 S | 7/2003 | Saleen |
| D491,121 S | 6/2004 | Yokomaku |
| 6,805,399 B1 | 10/2004 | Brown et al. |
| D514,497 S | 2/2006 | Fitzgerald |

* cited by examiner

*Primary Examiner*—Joseph D. Pape
(74) *Attorney, Agent, or Firm*—Gene Scott; Patent Law & Venture Group

(57) ABSTRACT

A mechanism for producing turbulent flow of the air moving over the rear deck of a vehicle is an air flow control apparatus comprising a vehicle spoiler of a typical and well known type having a horizontal portion joined integrally with spaced apart vertical standoffs. Mounted between the standoffs is a rotating spinner held in bearing sets. The spinner provides blades configured for rotating the spinner when the vehicle moves using its slipstream.

6 Claims, 2 Drawing Sheets

VEHICLE SPOILER WITH SPINNER MECHANISM

CROSS-REFERENCE TO RELATED APPLICATIONS

This is a continuation-in-part application of U.S. Design Patent application Ser. No. 29/230,466, filed May 20, 2005 and which is incorporated herein by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTTED ON A COMPACT DISC

Not applicable.

REFERENCE TO A "MICROFICHE APPENDIX"

Not applicable.

BACKGROUND OF THE INVENTION

1. Field of the Present Disclosure

This disclosure relates generally to devices for controlling the flow of air over a vehicle and more particularly to a spinning device used in conjunction with an air spoiler enabled for producing eddies over the rear surface of a vehicle in order to reduce air stiction drag and to limit dust buildup.

2. Description of Related Art Including Information Disclosed Under 37 CFR 1.97 and 1.98

Brouch, et al., U.S. des 303103: A design patent for a vehicle wheel spinner hub unit. Choi, U.S. des 379080: A design patent for a three-spoked, fluted vehicle wheel spinner. Saleen, Stephen M., U.S. des 476831: A design patent for an automobile wing. Yokomaku, Hironao, U.S. des 491121: A design patent for a rear wing for an automobile. Fitzgerald, U.S. des 514497: A design patent for a motor vehicle wheel spinner. Brown, et al., U.S. Pat. No. 6,805,399, discloses a vehicle aero stabilizer(s) that is at least partially actuated by momentum forces generated on a weight when the vehicle is decelerating as when the brakes are applied. Movement of the weight translates forces to the vehicle aero stabilizer that cause the aero stabilizer to rotate to a more vertical position thereby adding aerodynamic drag forces to help slow the vehicle. Several options to doing this are offered including two or more aero stabilizers that may or may not rotate in concert. Much is dependent upon having an aerodynamically and weight balanced aero stabilizer(s) and limits on such balance are described. Damping systems to provide smooth operation and movement of the weight(s) and the aero stabilizers are also offered.

The related art described above discloses wheel hub spinners, rear wing or spoiler devices and a stabilizer for vehicles. However, the prior art fails to disclose a combination spoiler and spinner capable of providing non-laminar air flow. The present disclosure distinguishes over the prior art providing heretofore unknown advantages as described in the following summary.

BRIEF SUMMARY OF THE INVENTION

This disclosure teaches certain benefits in construction and use which give rise to the objectives described below.

It is well known in the automotive world, and especially in automotive racing, that the surface sticking effect of air as it flows over a vehicle's surface produces considerable drag. When the air flow is laminar or smooth-moving, it produces drag by two effects on a typical automobile; first by the surface sticking effect and second by generating a low pressure rearward of the top or canopy of the vehicle. This low pressure tends to retard the vehicle's forward movement. Both of these drag effects can be reduced and ultimately eliminated by causing the air nearest the vehicle's surface to move with a more turbulent manner. The presently described apparatus is a mechanism for producing turbulent flow of the air moving over the rear deck of a vehicle. It is an air flow control apparatus comprising a vehicle spoiler of a typical and well known type having a horizontal portion joined integrally with spaced apart vertical standoffs. Mounted between the standoffs is a rotating spinner held in bearing sets. The spinner provides blades configured for rotating the spinner when the vehicle moves.

A primary objective inherent in the above described apparatus and method of use is to provide advantages not taught by the prior art.

Another objective is to provide such an apparatus that is able to cause turbulent air flow over a rear surface of a vehicle.

A further objective is to provide such an apparatus that reduces air flow drag on vehicle.

A still further objective is to provide such an apparatus that reduces a surface dust accumulation effect on a rear desk of a moving vehicle.

Other features and advantages of the present invention will become apparent from the following more detailed description, taken in conjunction with the accompanying drawings, which illustrate, by way of example, the principles of the presently described apparatus and method of its use.

BRIEF DESCRIPTION OF THE SEVERAL VIEWS OF THE DRAWING(S)

Illustrated in the accompanying drawing(s) is at least one of the best mode embodiments of the present invention In such drawing(s):

DETAILED DESCRIPTION OF THE INVENTION

The above described drawing figures illustrate the described apparatus and its method of use in at least one of its preferred, best mode embodiment, which is further defined in detail in the following description. Those having ordinary skill in the art may be able to make alterations and modifications what is described herein without departing from its spirit and scope. Therefore, it must be understood that what is illustrated is set forth only for the purposes of example and that it should not be taken as a limitation in the scope of the present apparatus and method of use.

Figure 1:
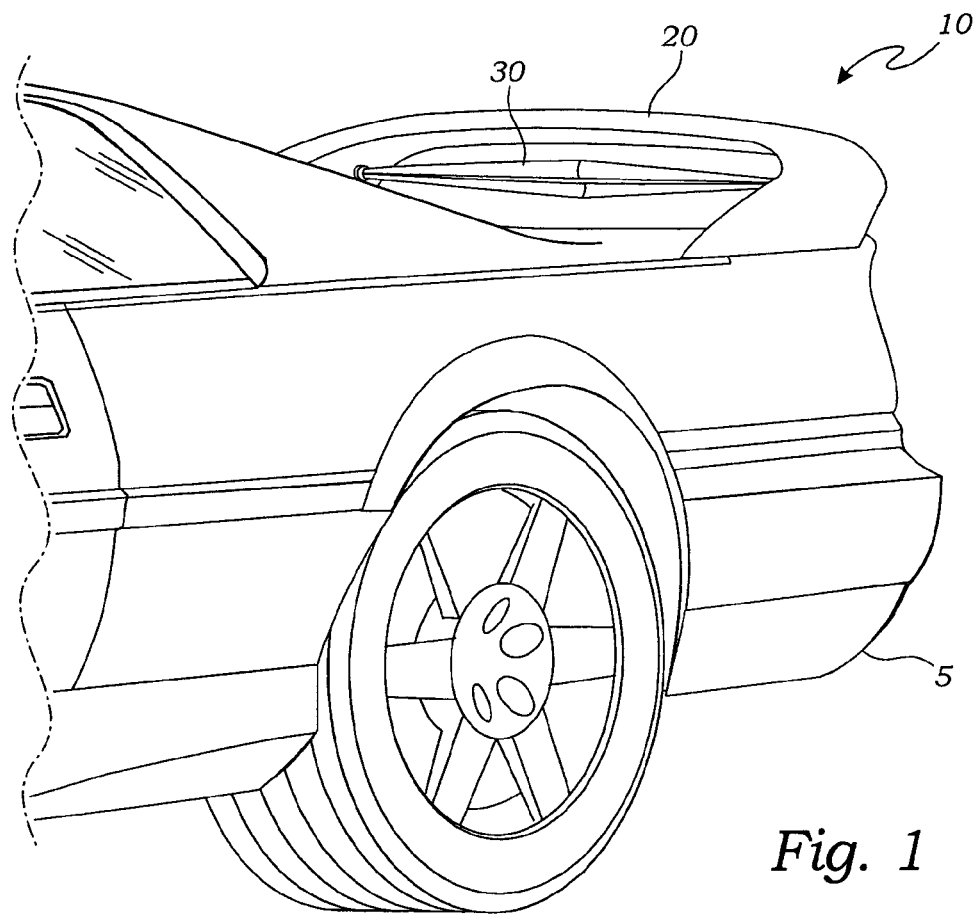
FIG. 1 is a perspective view of the presently described apparatus.
Figure 4:
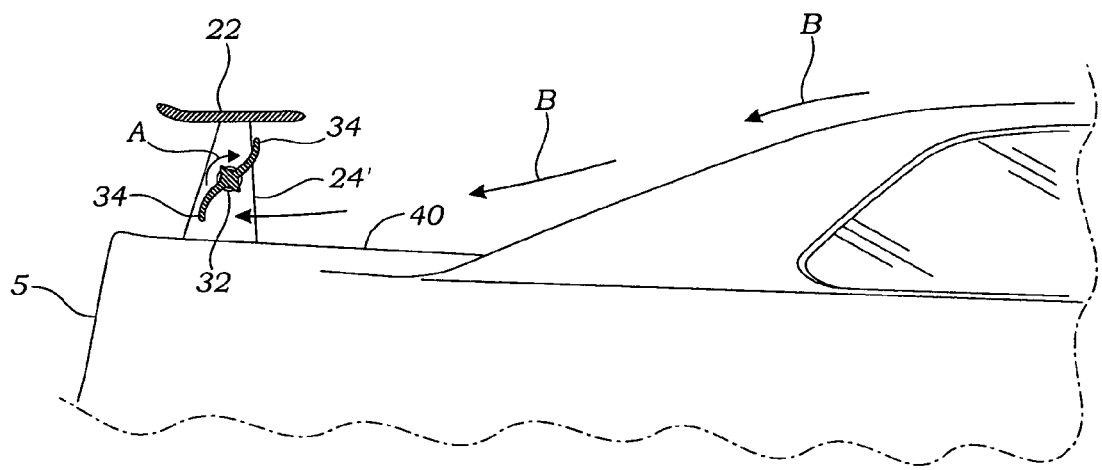
FIG. 4 is a vertical sectional view thereof taken along line 4—4 in FIG. 3.

Described now in detail is an air flow control apparatus 10 as best seen in FIG. 1. The apparatus, preferably made of plastic or metal, includes a vehicle spoiler 20 providing a horizontal portion 22 joined integrally with spaced apart vertical standoffs 24' and 24". Such spoilers 20 are well known in the art. In the present apparatus, the spoiler 20 preferably comprises a horizontal plate with a trailing edge curved upwardly as is shown in FIG. 4. Mounted between the standoffs 24' and 24" is a spinner 30 held within opposing bearing sets 32 which may be typical roller or ball bearing units well known in the art. The bearing sets 32 enable the spinner 30 to rotate at a high velocity driven by the slipstream moving across the vehicle 5. The spinner 30 provides blades 34 configured for rotating the spinner 30. Preferably the spinner is mounted across the vehicle 5 and has a length comparable to the vehicle's width.

Figure 2:
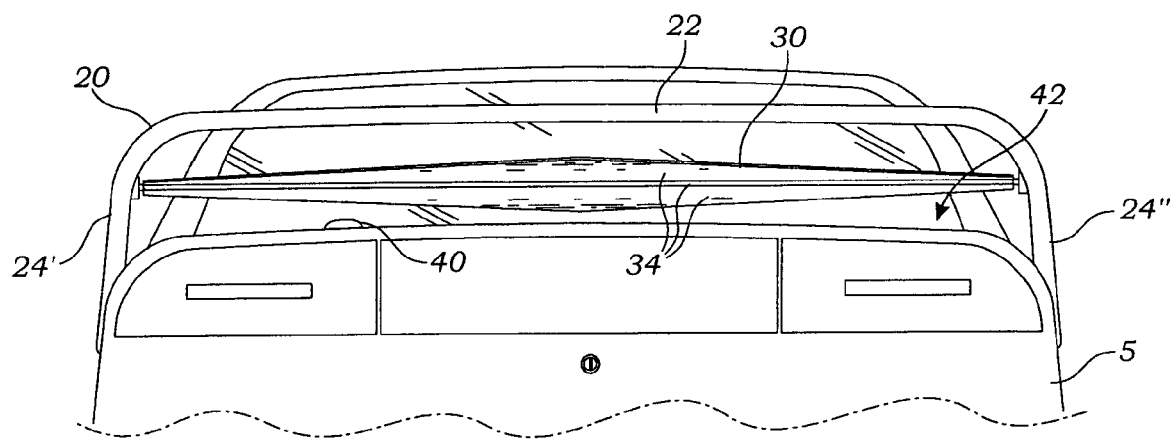
FIG. 2 is a rear elevational view of one embodiment thereof.
Figure 3:
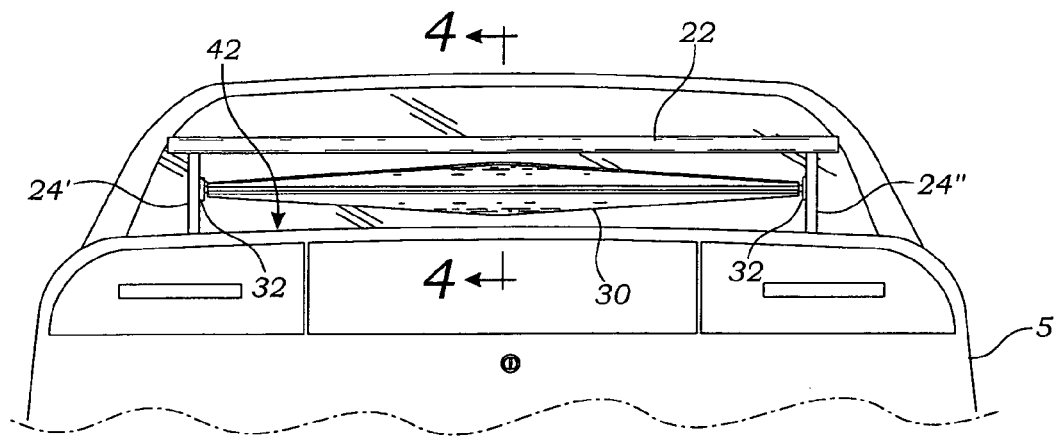
FIG. 3 is a rear elevational view of a second embodiment thereof.

The spoiler is mounted on the rear deck 40 of a vehicle 5. Such a rear deck 40 may be the lid of a trunk of the vehicle as is usual in passenger automobiles, or it may be the rear surface of a racing motorcar. The rear deck 40 provides an approximately horizontal surface 42. The spinner 30 is positioned between the horizontal surface 42 and the horizontal portion 22 of the vehicle spoiler 20 as best seen in FIGS. 2 and 3.

Preferably, the vertical standoffs 24' and 24" of the spoiler 20 are engaged with and extend upwardly from the rear deck 40. In one embodiment shown in FIG. 2, the standoffs 24' and 24" are joined with the horizontal portion 22 in smooth curves at the extreme left and right sides of the spoiler 20. In a second embodiment shown in FIG. 3, the standoffs 24' and 24" abut the horizontal portion 22 at right angles and inwardly from the ends of portion 22.

The blades 34 are preferably curved for rotating the spinner 30 in a clockwise rotational direction when viewed from a right side of the vehicle as shown in the cross-sectional view of FIG. 4. The slipstream moving over the rear deck 40 tends to be compressed close to the deck surface 42 and tends to eddy in a clockwise manner in the vicinity of the spinner 30. This air movement causes the spinner 30 to rotate as shown by arrow A in FIG. 4. A high rotational velocity of spinner 30 causes air to move by centripetal force in a radial direction away from spinner 30 and this produces turbulence which breaks-up the otherwise laminar slip stream which is shown by arrows B in FIG. 4. It has been found that improved results are achieved when the spinner blades 34 are largest at a medial position on the spinner 30 and when the blades taper diminishingly in size at points moving away from the medial position.

The enablements described in detail above are considered novel over the prior art of record and are considered critical to the operation of at least one aspect of the apparatus and its method of use and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that each named inventor believes that the claimed subject matter is what is intended to be patented.

What is claimed is:

1. An air flow control apparatus comprising: a vehicle spoiler providing a horizontal portion joined integrally with spaced apart vertical standoffs, and mounted between the standoffs, a spinner held within opposing bearing sets, the spinner providing blades configured for spinning the spinner when air moves below the spoiler.

2. The apparatus of claim 1 further comprising a vehicle rear deck, the rear deck providing an approximately horizontal surface, the spinner positioned between the horizontal surface and the horizontal portion of the vehicle spoiler.

3. The apparatus of claim 2 wherein the vertical standoffs of the spoiler are engaged with and extend upwardly from the rear deck.

4. The apparatus of claim 1 wherein the blades are curved for spinning the spinner in a clockwise rotational direction when viewed from a right side of the vehicle.

5. The apparatus of claim 2 wherein the spinner has a length approximately equal to a width of the rear deck.

6. The apparatus of claim 1 wherein the blades are tapered diminishingly from a medial position.

* * * * *